United States Patent
Yamagishi et al.

(10) Patent No.: US 6,318,140 B1
(45) Date of Patent: Nov. 20, 2001

(54) METHOD OF MANUFACTURING LAMINATED RING AND APPARATUS FOR MEASURING CIRCUMFERENTIAL LENGTH DIFFERENCE OF RING IN SUCH METHOD

(75) Inventors: Hiroaki Yamagishi; Tomotsugu Takahashi; Masahiko Yamauchi, all of Sayama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/670,272

(22) Filed: Sep. 27, 2000

(30) Foreign Application Priority Data

Oct. 8, 1999 (JP) ................................................ 11-288277
Nov. 2, 1999 (JP) ................................................ 11-312885

(51) Int. Cl.$^7$ ..................................................... B21D 15/00
(52) U.S. Cl. ............................. 72/110; 72/14.4; 72/21.4; 72/111; 72/365.2; 72/378
(58) Field of Search ..................................... 72/13.4, 14.3, 72/14.4, 14.5, 20.1, 21.3, 21.4, 21.5, 110, 111, 168, 183, 205, 365.2, 378

(56) References Cited

U.S. PATENT DOCUMENTS 4,176,538 * 12/1979 Kymmell et al. ...................... 72/111
5,640,868 * 6/1997 Lavener .................................. 72/110

FOREIGN PATENT DOCUMENTS

| A11281342 | 10/1999 | (JP) . | |
|---|---|---|---|
| A11290908 | 10/1999 | (JP) . | |
| A11290971 | 10/1999 | (JP) . | |
| 61-82910 | * 4/1986 | (JP) | ...................................... 72/111 |
| 61-132206 | * 6/1986 | (JP) | ...................................... 72/111 |
| 61-202703 | * 9/1986 | (JP) | ...................................... 72/111 |

* cited by examiner

Primary Examiner—Ed Tolan
(74) Attorney, Agent, or Firm—Birch, Stewart, Kolasch & Birch, LLP

(57) ABSTRACT

A laminated ring is manufactured by severing a cylindrical drum, which comprises a sheet of maraging steel with welded opposite ends, into a plurality of rings of predetermined width, rolling the rings to a predetermined target circumferential length, correcting circumferential lengths of the rings, aging and nitriding the rings, and laminating the rings into a laminated ring for transmitting power in a continuously variable transmission. A load applied to a circumferential edge of each of the rolled rings and a load applied to another circumferential edge thereof are measured while supporting an inner circumferential surface of the ring and applying a tensile load in a direction to expand the ring. The difference between circumferential lengths of the circumferential edges of the ring is detected based on the difference between the loads applied to the circumferential edges when the difference between the loads is maximum.

11 Claims, 10 Drawing Sheets

METHOD OF MANUFACTURING LAMINATED RING AND APPARATUS FOR MEASURING CIRCUMFERENTIAL LENGTH DIFFERENCE OF RING IN SUCH METHOD

BACKGROUND OF THE INVENTION

1. Field of the Invention

The present invention relates to a method of manufacturing a laminated ring for use in a continuously variable transmission, and an apparatus for measuring the circumferential length difference of a ring in such a method.

2. Description of the Related Art

Continuously variable transmissions have a power transmitting belt trained around a pair of pulleys. The power transmitting belt comprises a laminated ring composed of a plurality of rings and mounted on and held by an element of predetermined shape.

The laminated ring is straight in shape when traveling between the pulleys, and curved in shape when running along the pulleys. The laminated ring undergoes severe bending deformations due to repetitive cycles of the straight and curved states. Therefore, the laminated ring is required to have a mechanical strength large enough to withstand the severe bending deformations.

One known material capable withstanding such severe bending deformations is maraging steel. The maraging steel is a low-carbon steel containing 17 to 19% of Ni, and Co, Mo, Ti, etc. When the maraging steel is heated to a suitable temperature after being subjected to a solution treatment, it causes age hardening in a martensitic state, resulting in an ultra-high strength steel that is highly strong and highly tough. The maraging steel is highly suitable for use as the material of the laminated ring.

The laminated ring has heretofore been manufactured according to the following process: The ends of a thin sheet of maraging steel that is an ultra-high strength steel are welded to each other, producing a cylindrical drum. The cylindrical drum is subjected to a first solution treatment in order to uniformize the hardness that has been partly increased due to the heat applied when the thin sheet of maraging steel was welded. Then, the cylindrical drum is severed into rings of certain width, which are rolled to a predetermined target circumferential length. The rings are then subjected to a second solution treatment in order to recrystallize the rolled structure for restoring the metal crystal grain configuration that has been deformed by the rolling process.

The rings are rolled such that the circumferential lengths of the rolled rings will be equalized to the predetermined target circumferential length. Actually, however, the circumferential lengths of the rolled rings suffer an error as a difference from the target circumferential length. Therefore, the rings that has been subjected to the second solution treatment are corrected for the target circumferential length, and then aged and nitrided for increased hardness. The rings of slightly different circumferential lengths are fitted and laminated together into a laminated ring.

The rings of certain width which have been severed from the cylindrical drum are in the shape of an endless ribbon. When a ring thus shaped is trained around a pair of rollers and rolled by increasing the diameter of the ring under certain tension, a circumferential length difference is developed between opposite circumferential edges of the ring, causing the ring to take on a tapered cross-sectional shape. More specifically, since each of the rollers is supported at one end of its shaft or in a cantilevered fashion, the other ends of the shafts of the respective rollers tend to be tilted toward each other under the stress from the ring. When the ring supported on the rollers whose shafts are thus tilted is rolled, the ring has its cross-sectional shape tapered.

When a plurality of rings having tapered cross-sectional shapes and slightly different circumferential lengths are fitted and laminated together into a laminated ring, it is difficult to combine the rings accurately because of the circumferential length difference present between the opposite circumferential edges of each of the rings. Therefore, the resultant laminated ring may not possibly be used as an endless belt for continuously variable transmissions. In addition, since the maraging steel used as the material of the rings is relatively expensive, the cost of produced laminated rings will become high if there are any rings that cannot be used as an endless belt for continuously variable transmissions due to the circumferential length difference.

One solution is to adjust the angles of the tilted shafts of the rollers which support the ring when the ring is to be rolled, for thereby minimizing the circumferential length difference that is present between the opposite circumferential edges of the ring. In order to accurately adjust the angles of the tilted shafts of the rollers, it is necessary to recognize precisely the circumferential length difference that is present between the opposite circumferential edges of the rolled ring. There has been a demand for a method of and an apparatus for accurately and easily measuring the circumferential length difference that is present between the opposite circumferential edges of a ring.

As described above, the circumferential length of a rolled ring is corrected for a target circumferential length after it has been subjected to a solution treatment to recrystallize the rolled structure. The circumferential length of the rolled ring is corrected by training the ring around a pair of rollers, rotating the rollers, and displacing a smaller-diameter roller disposed between the rollers in a direction perpendicular to the ring for thereby extending the ring.

The distance that the smaller-diameter roller is to be displaced is determined based on the circumferential length of the rolled ring and the desired circumferential length to be attained after the correction of the circumferential length of the rolled ring. The actual circumferential lengths of the rings after they have been subjected to the solution treatment are distributed in a considerably wide range due to variations of conditions in the rolling process and the solution treatment. Therefore, if the distance that the smaller-diameter roller is to be displaced is determined evenly based on the desired circumferential length to be attained by the rolled ring, then the corrected circumferential lengths of the rings are also distributed in a wide range. If the corrected circumferential lengths of the rings are distributed in a wide range, then many rings tend to fail to be fitted and laminated together into a laminated ring, and hence cannot be used as an endless belt for continuously variable transmissions. Consequently, the cost of produced laminated rings will become high if there are any rings that cannot be used as an endless belt for continuously variable transmissions.

It has been desired in the art to develop a method capable of correcting the circumferential length of a ring at a desired circumferential length.

SUMMARY OF THE INVENTION

It is therefore an object of the present invention to provide a method of manufacturing an endless metal ring while accurately and easily measuring the circumferential length difference developed between opposite circumferential edges of a rolled ring, and an apparatus for measuring the circumferential length difference of a ring in such a method.

Another object of the present invention is to provide a method of manufacturing a laminated ring while easily and reliably correcting the circumferential length of a rolled ring at a desired circumferential length.

To achieve the above objects, there is provided in accordance with the present invention a method of manufacturing a laminated ring by severing a cylindrical drum, which comprises a sheet of maraging steel with welded opposite ends, into a plurality of rings of predetermined width, rolling the rings to a predetermined target circumferential length, correcting circumferential lengths of the rings, aging and nitriding the rings, and laminating the rings into a laminated ring for transmitting power in a continuously variable transmission, the method comprising the steps of measuring a load applied to a circumferential edge of each of the rolled rings and a load applied to another circumferential edge thereof while supporting an inner circumferential surface of the ring and applying a tensile load in a direction to expand the ring, and detecting the difference between circumferential lengths of the circumferential edges of the ring based on the difference between the loads applied to the circumferential edges when the difference between the loads is maximum.

In the above method, while a tensile load is being applied in a direction to expand the ring, a load applied to a circumferential edge of each of the rolled rings and a load applied to another circumferential edge thereof are measured. If there is no difference between the circumferential lengths of the circumferential edges of the ring, then there is no difference between the loads applied to the circumferential edges of the ring at the time the ring starts being deformed in the direction to expand the ring under the tensile load. Therefore, the ring can be judged as acceptable.

If there is a difference between the circumferential lengths of the circumferential edges of the ring, then since the circumferential edge of the ring which has the smaller circumferential length starts being deformed, i.e., extended, prior to the circumferential edge of the ring which has the greater circumferential length, there is developed a difference between the loads applied to the circumferential edges of the ring. The difference between the loads applied to the circumferential edges of the ring is maximum when the circumferential edge of the ring which has the smaller circumferential length is extended until the circumferential lengths of the circumferential edges of the ring are equalized. Because the difference between the loads applied to the circumferential edges of the ring at this time can be obtained based on the difference between the circumferential lengths of the circumferential edges of the ring, the difference between the loads can be converted into the difference between the circumferential lengths. Therefore, the difference between the circumferential lengths of the circumferential edges of the ring can be detected easily and accurately.

The accurately detected difference between the circumferential lengths of the circumferential edges of the ring can be reflected in the formation of the ring, e.g., the rolling process of the ring, so that the ring can be formed with improved accuracy.

The method may further comprise the step of, after the steps of detecting the difference between circumferential lengths of the circumferential edges of the ring, correcting the ring in shape to equalize the circumferential lengths of the circumferential edges of the ring by applying a tensile load to the ring until the loads applied to the circumferential edges of the ring are equalized.

The tensile load is applied to the ring in order to measure the difference between the loads applied to the circumferential edges of the ring. When the tensile load is applied to the ring, the ring can easily be deformed in the direction to expand the ring. If there is a difference between the circumferential lengths of the circumferential edges of the ring, then the tensile load is further applied to the ring while the circumferential lengths of the circumferential edges of the ring are being subsequently equalized when the difference between the circumferential lengths of the circumferential edges of the ring is detected. At the time the difference between the circumferential lengths of the circumferential edges of the ring is detected, there is a difference between the loads applied to the circumferential edges of the ring even when the circumferential lengths of the circumferential edges of the ring are equalized. Therefore, if the tensile load is canceled at this time, then the ring springs back, and the circumferential lengths of the circumferential edges of the ring are not equalized.

By further applying the tensile load to the ring, the overall circumferential length of the ring is increased while the circumferential lengths of the circumferential edges of the ring are being equalized. As the overall circumferential length of the ring is increased, the difference between the loads applied to the circumferential edges of the ring is reduced. If the loads applied to the circumferential edges of the ring are equalized, then even when the tensile load is canceled, the circumferential lengths of the circumferential edges of the ring remain equal to each other. Thus, the ring is corrected into a good shape.

As described above, if there is a difference between the circumferential lengths of the circumferential edges of the ring, then the difference between the circumferential lengths of the circumferential edges of the ring is measured, and thereafter the ring is corrected in order to eliminate the difference between the circumferential lengths of the circumferential edges of the ring. Consequently, the ring made of expensive maraging steel is prevented from being wasted, and hence the cost of the laminated ring can be reduced.

The method may further comprise the steps of training the ring which has been corrected in shape to equalize the circumferential lengths of the circumferential edges thereof, around a drive roller and a driven roller which are displaceable in directions toward and away from each other and a correction roller disposed intermediate between the drive roller and the driven roller and displaceable in directions perpendicular to the directions in which the drive roller and the driven roller are displaceable, displacing the drive roller and the driven roller away from each other under a given force, determining an actual circumferential length of the ring while keeping the ring taut around the drive roller and the driven roller, determining the difference between the actual circumferential length of the ring and the target circumferential length for the rolled ring as a reference value, and calculating a distance that the correction roller is to be displaced depending on the difference between the actual circumferential length and the reference value, and holding the drive roller and the driven roller spaced by a predetermined distance from each other, and displacing the correction roller in a direction perpendicular to the directions in which the drive roller and the driven roller are displaceable and to extend the ring, by the calculated distance depending on the difference between the actual circumferential length and the reference value, for thereby correcting the circumferential length of the ring.

Basically, the drive roller and the driven roller around which the ring is trained is kept spaced by a predetermined distance from each other, and the correction roller is displaced in a direction perpendicular to the directions in which the drive roller and the driven roller are displaceable and to extend the ring. The ring is thus subjected to plastic deformation, correcting its circumferential length.

The actual circumferential lengths of the rolled rings are distributed in a considerably wide range, as describe above. Therefore, if the distance that the correction roller is to be displaced is determined evenly based on the target circumferential length to be attained by the rolled rings, then the corrected circumferential lengths of the rings are also distributed in a wide range. According to the present invention, the drive roller and the driven roller are displaced away from each other under a given force, and an actual circumferential length of the ring is determined while keeping the ring taut around the drive roller and the driven roller. Then, the difference between the actual circumferential length of the ring and the target circumferential length for the rolled ring as a reference value is determined, and a distance that the correction roller is to be displaced is calculated depending on the difference between the actual circumferential length and the reference value.

As a result, when the correction roller is displaced by the calculated distance, the ring can be corrected easily and reliably at the desired circumferential length.

The step of calculating the distance that the correction roller is to be displaced may comprise the step of adding a corrective value established depending on the difference between the actual circumferential length and the reference value, to the reference value or subtracting the corrective value from the reference value.

The method may further comprise the step of holding the correction roller displaced by the calculated distance until the ring keeps the shape extended by the correction roller when the ring is released from the correction roller, for thereby correcting the circumferential length of the ring.

In this manner, the ring is subjected to plastic deformation to reach a length corresponding to the displacement of the correction roller. Even when the ring is released from the correction roller, the ring does not spring back, and its circumferential length can reliably be corrected.

The above process of correcting the circumferential length is applicable not only to those rings which have been corrected in shape, but also to any rings insofar as they are shaped to have the same circumferential length along the opposite circumferential edges thereof.

According to the present invention, there is also provided an apparatus for measuring the difference between the circumferential lengths of circumferential edges of each of rings produced by severing a cylindrical drum, which comprises a sheet of maraging steel with welded opposite ends, into a plurality of rings of predetermined width, and rolling the rings to a predetermined target circumferential length. The apparatus comprises a pair of support means for supporting the ring trained therearound, load imparting means for imparting a tensile load to the ring by spacing the support means away from each other, first load measuring means mounted on one of the support means, for abutting against an inner surface of one of the circumferential edges of the ring and measuring a load imparted to the one of the circumferential edges of the ring, second load measuring means disposed in juxtaposed relationship to the first load measuring means, for abutting against an inner surface of the other circumferential edge of the ring and measuring a load imparted to the other circumferential edge of the ring, and circumferential length difference detecting means for detecting the difference between the circumferential lengths of the circumferential edges of the ring based on the difference between the load measured by the first load measuring means and the load measured by the second load measuring means when the difference between the loads is maximum.

In the above apparatus, the ring is trained around the support means, and the load imparting means imparts a tensile load to the ring. The first and second load measuring means on one of the support means can easily and accurately measure loads imparted to the respective circumferential edges of the ring while the tensile load is being applied to the ring by the load imparting means.

When the difference between the loads imparted to the respective circumferential edges of the ring is maximum, the circumferential length difference detecting means detects the difference between the circumferential lengths of the circumferential edges of the ring. The difference between the circumferential lengths of the circumferential edges of the ring can thus be measured quickly.

The first load measuring means may have a first abutment member for abutment against the inner surface of the one circumferential edge of the ring, and the second load measuring means may have a second abutment member for abutment against the inner surface of the other circumferential edge of the ring. The first abutment member and the second abutment member may be disposed in juxtaposed relationship to each other with a gap interposed therebetween which is held out of contact with an inner surface of the ring between the circumferential edges thereof. The other of the support means may have another first abutment member for abutment against the inner surface of the one circumferential edge of the ring which is opposite to the inner surface of the one circumferential edge of the ring against which the first abutment member abuts, and another second abutment member for abutment against the inner surface of the other circumferential edge of the ring which is opposite to the inner surface of the other circumferential edge of the ring against which the second abutment member abuts. The other first abutment member and the other second abutment member may be disposed on the other support means in juxtaposed relationship to each other with a gap interposed therebetween which is held out of contact with an inner surface of the ring between the circumferential edges thereof.

The ring supported on the pair of support means has its one circumferential edge held in abutment against the first abutment member and the other first abutment member, and the other circumferential edge held in abutment against the second abutment member and the other second abutment member. At this time, between the first abutment member and the second abutment member and also between the other first abutment member and the other second abutment member, the interposed gaps are held out of contact with the inner surface of the ring between the circumferential edges thereof.

Thus, the load measured on the one circumferential edge of the ring by the first load measuring means and the load measured on the other circumferential edge of the ring by the second load measuring means are not affected by a load applied between the circumferential edges of the ring, and hence are highly accurate.

The apparatus may further comprise correction means for applying a tensile load to the ring until the load measured by the first load measuring means and the load measured by the second load measuring means are equalized to each other, for thereby correcting the ring in shape to equalize the circumferential lengths of the circumferential edges of the ring.

The correction means is capable of easily correcting those rings whose circumferential lengths of the circumferential edges differ from each other and which have heretofore been rejected as defective rings, into acceptable rings which have the same circumferential length along the circumferential edges. Since the ring can be corrected in a continuous process following the measurement of the difference between the circumferential lengths of the circumferential edges of the ring, the ring can be corrected easily and quickly with high efficiency.

The above and other objects, features, and advantages of the present invention will become apparent from the following description when taken in conjunction with the accompanying drawings which illustrate a preferred embodiment of the present invention by way of example.

DESCRIPTION OF THE PREFERRED EMBODIMENTS

Figure 1:
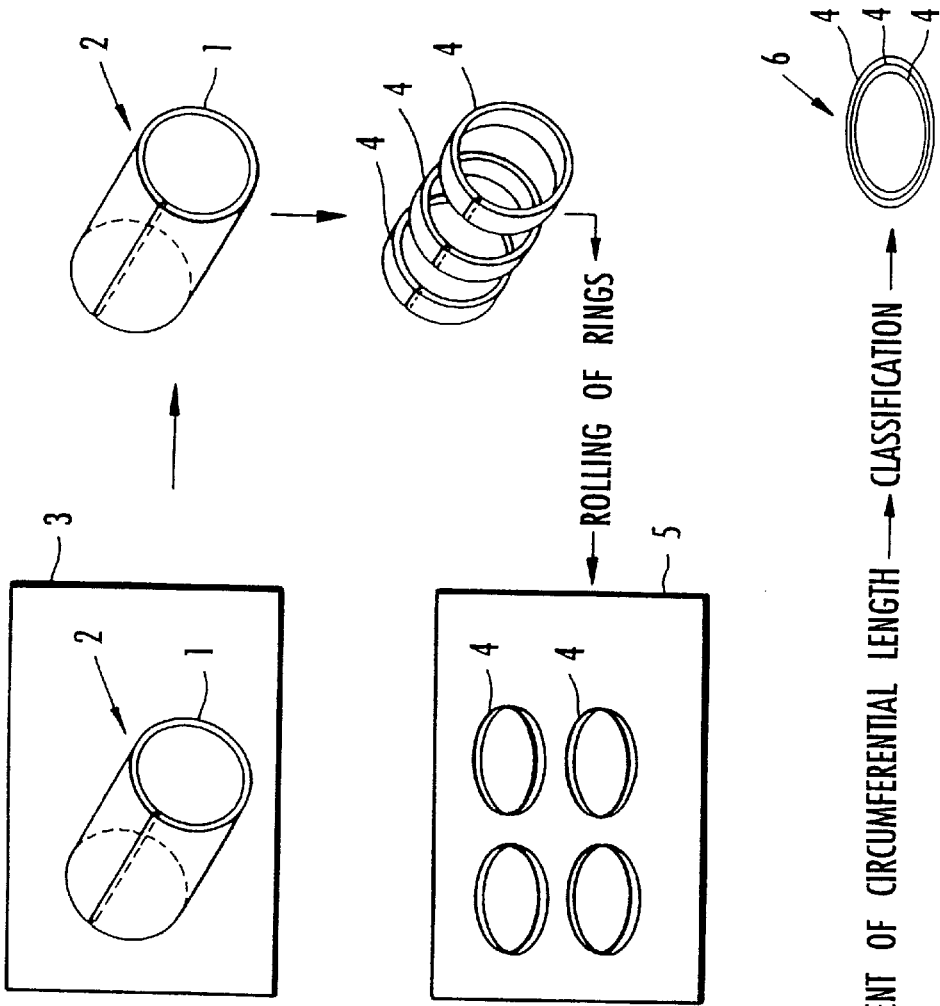
FIG. 1 is a schematic view showing successive steps of a method of manufacturing a laminated ring according to the present invention.
Figure 1:
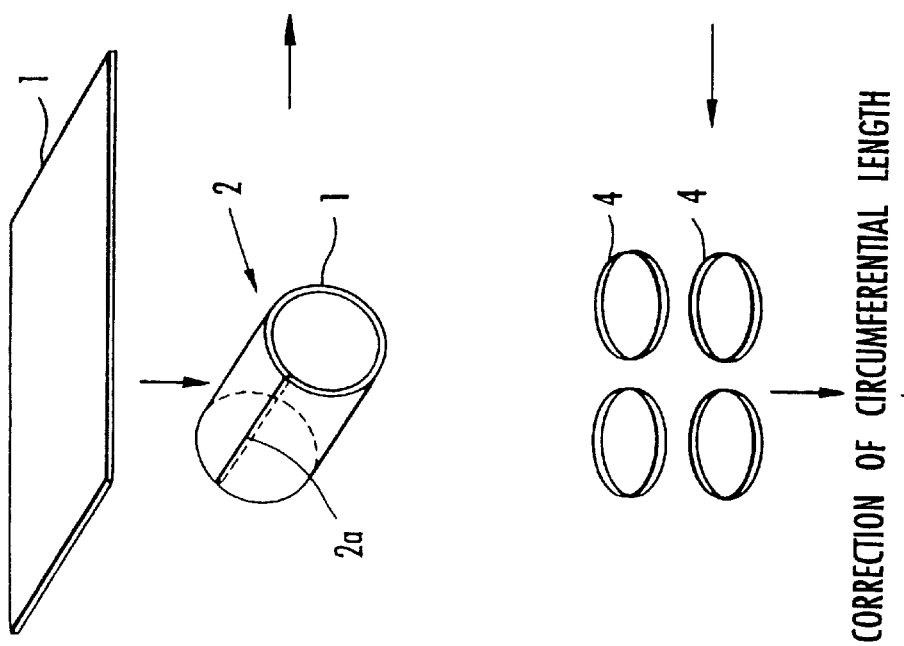

In a method of manufacturing a laminated ring according to the present invention, as shown in FIG. 1, a thin sheet 1 of maraging steel is bent into a loop, whose opposite ends are welded to each other to produce a cylindrical drum 2. Since the maraging steel exhibits aged hardness due to the heat applied when the thin sheet 1 of maraging steel was welded, the cylindrical drum 2 has regions of increased hardness on opposite sides of a welded seam 2a thereof. Therefore, the cylindrical drum 2 suffers hardness irregularities.

To eliminate such hardness irregularities, the cylindrical drum 2 is placed in a vacuum furnace 3 and subjected to a first solution treatment process. The first solution treatment process thus carried out uniformizes the hardness of the cylindrical drum 2. After the first solution treatment process, the cylindrical drum 2 is removed from the vacuum furnace 3, and severed into rings 4 of certain width.

After the rings 4 are rolled, they are placed in a heating furnace 5 in which they are subject to a second solution treatment process to restore the metal crystal grain configuration that has been deformed by the rolling process to the configuration prior to the rolling process.

After the second solution treatment process, the rings 4 are removed from the heating furnace 5, and corrected for their circumferential lengths. The rings 4 whose circumferential lengths have been corrected are then aged and nitrided. Thereafter, the circumferential lengths of the rings 4 are measured, and the rings 4 are classified into ranges of circumferential lengths. From the classified rings 4, those rings 4 that can be fitted and laminated together are selected. Then, a plurality of rings 4 whose circumferential lengths are slightly different from each other are fitted and laminated together into a laminated ring 6.

Figure 2:
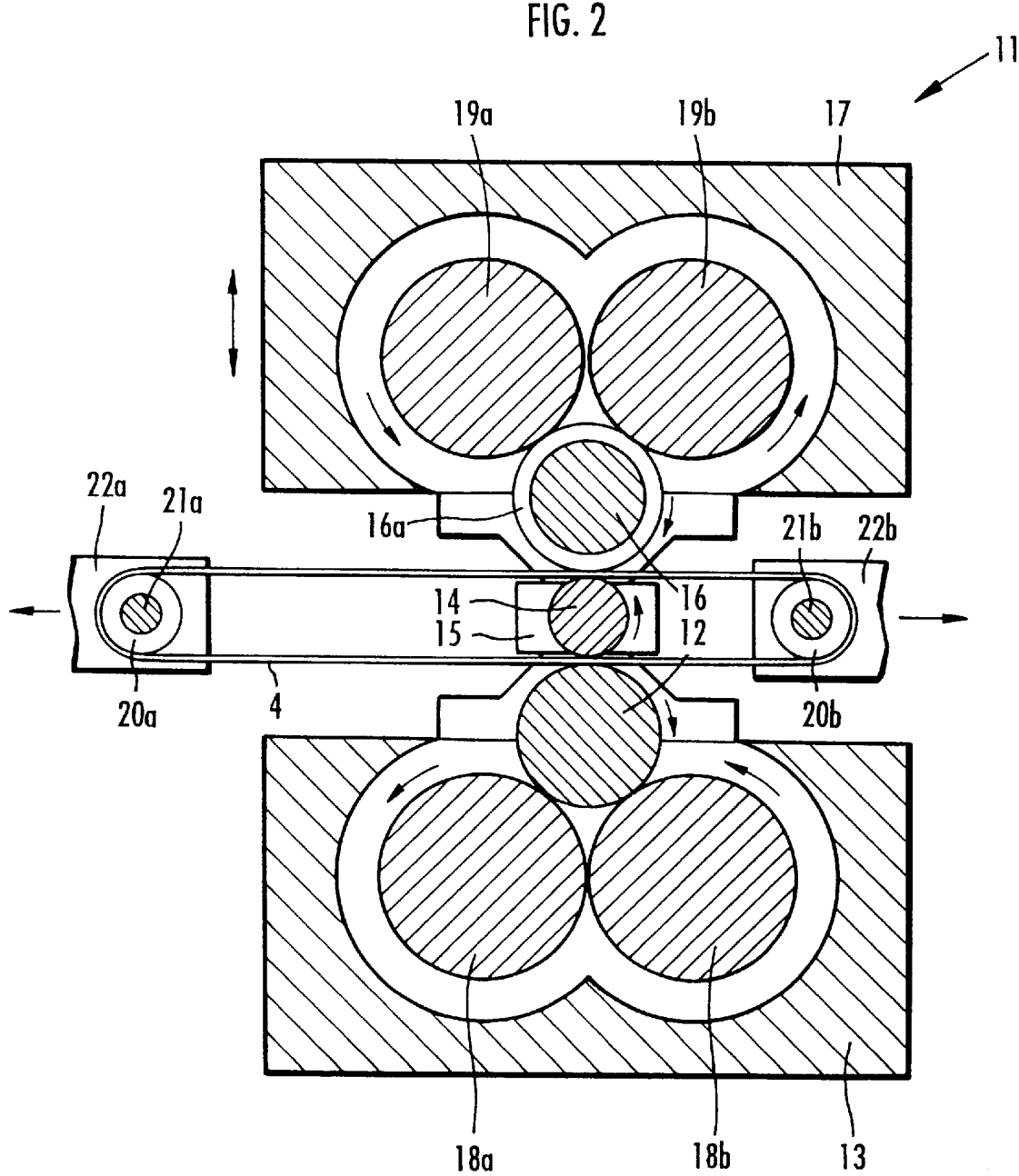
FIG. 2 is a cross-sectional view of an apparatus for rolling a ring.

Each of the rings 4 is rolled by a rolling apparatus 11 shown in FIG. 2. As shown in FIG. 2, the rolling apparatus 11 comprises a base unit 13 having a rolling roller 12, an intermediate unit 15 having a central roller 14 disposed above the base unit 13 and held against the rolling roller 12, and an upper unit 17 disposed vertically movably above the intermediate unit 15 and having a guide roller 16 that can be held against the central roller 14 when the upper unit 17 is moved downwardly.

The base unit 13 has a pair of rotatable backup rollers 18a, 18b disposed beneath and held against the rolling roller 12 for supporting the rolling roller 12 to prevent the shaft thereof from being tilted when the central roller 14 is held against the rolling roller 12. The upper unit 17 has a pair of rotatable backup rollers 19a, 19b disposed above and held against the guide roller 16 for supporting the guide roller 16 to prevent the shaft thereof from being tilted when the central roller 14 is held against the guide roller 16. The shafts of the rolling roller 12 and the guide roller 16 have respective gears that are held in mesh with a gear on the rotatable shaft of a motor (not shown) that is disposed intermediate between the rolling roller 12 and the guide roller 16. Therefore, the rolling roller 12 and the guide roller 16 rotate in the same direction when the motor is energized.

The intermediate unit 15 has a pair of tension rollers 20a, 20b disposed one on each side of the central roller 14. A ring 4 is trained around the central roller 14 and the tension rollers 20a, 20b. The tension rollers 20a, 20b are supported on respective arms 22a, 22b by respective rotatable shafts 21a, 21b. The arms 22a, 22b are actuated by respective actuators (not shown) to move in directions away from the central roller 14. The shafts of the central roller 14 and the tension rollers 20a, 20b are supported in a cantilevered fashion, and the ring 4 is placed onto the central roller 14 and the tension rollers 20a, 20b from their unsupported ends.

The rolling apparatus 11 shown in FIG. 2 operates as follows: With the upper unit 17 displaced upwardly, the ring 4 is placed onto the central roller 14 and the tension rollers 20a, 20b from their unsupported ends. At this time, the ring 4 is sandwiched between the rolling roller 12 and the central roller 14.

Then, the upper unit 17 displaced downwardly. The guide roller 16 has a groove 16a defined in an outer circumferential surface thereof which receives and guides the ring 4 therein. The guide roller 16 is held against the central roller 14 on opposite sides of the ring 4.

Then, the arms 22a, 22b are displaced away from the central roller 14 to impart a tensile load on the ring 4. The non-illustrated motor is energized to rotate the rolling roller 12 and the guide roller 16 to roll the ring 4 to a predetermined target circumferential length between the rolling roller 12 and the guide roller 16.

The rolling roller 12 and the guide roller 16 are supported by the backup rollers 18a,18b, 19a, 19b to prevent their shafts from being tilted. The ring 4 is reliably sandwiched between the rolling roller 12 and the central roller 14 and guided by the groove 16a in the guide roller 16. Therefore, the ring 4 is less subject to wobbling movement when it runs around the tension rollers 20a, 20b. As a result, the tension rollers 20a, 20b are free of irregular loads, and hence their shafts 21a, 21b are prevented from being tilted. Consequently, the ring 4 is prevented from having a tapered cross-sectional shape due to a circumferential length difference between the opposite circumferential edges of the ring 4.

Then, a circumferential length difference between the opposite circumferential edges of the ring 4 rolled by the rolling apparatus 11 is measured, and, if the ring 4 has a tapered cross-sectional shape, then the ring 4 is corrected out of the tapered cross-sectional shape. The circumferential length difference between the opposite circumferential edges of the ring 4 is measured by an apparatus 31 for measuring the circumferential length difference of a ring as shown in FIG. 3.

Figure 3:
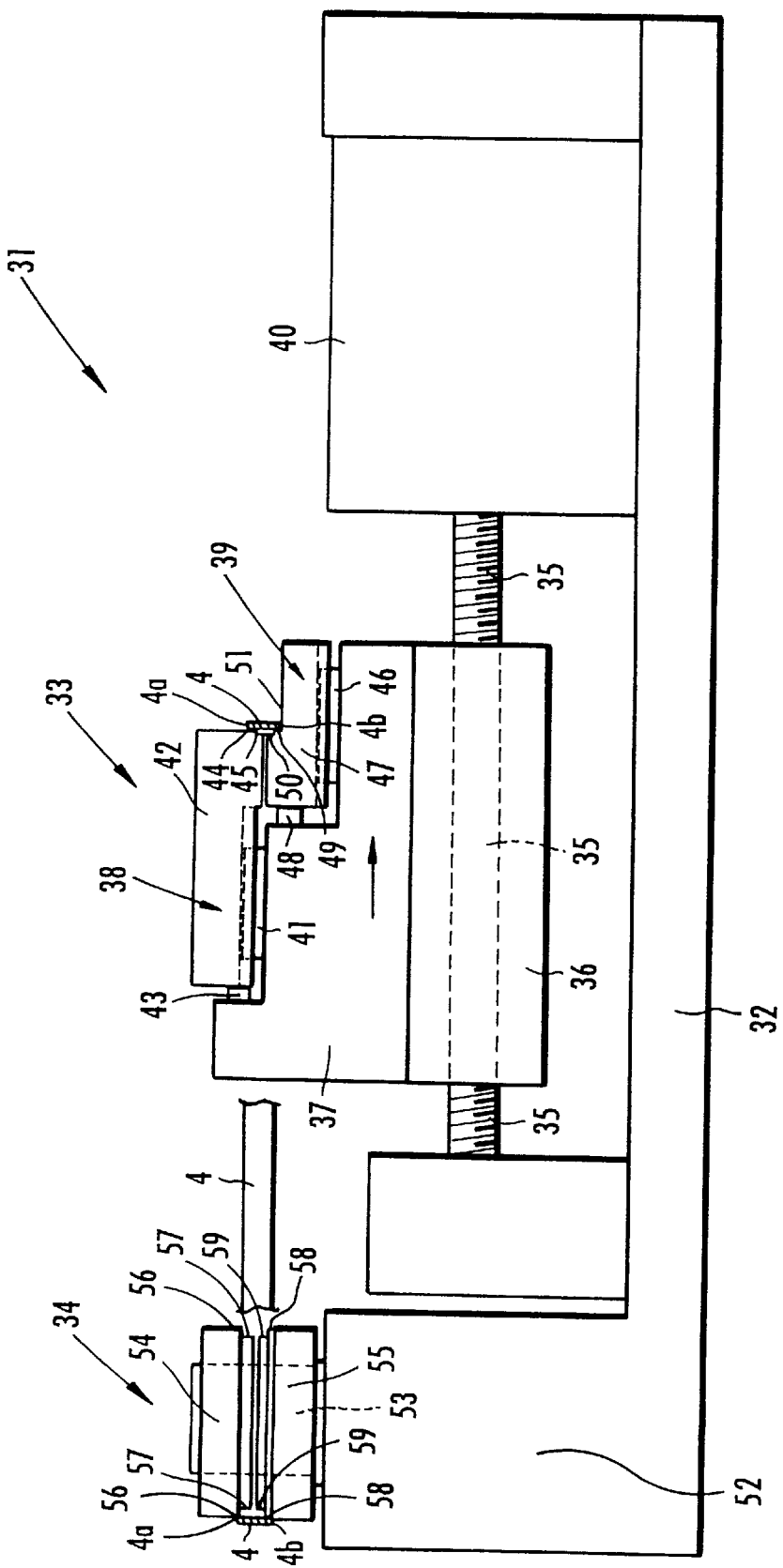
FIG. 3 is a side elevational view of an apparatus for measuring the circumferential length difference of a ring according to the present invention.

As shown in FIG. 3, the apparatus 31, i.e., the circumferential length difference measuring apparatus 31, comprises a base 32, a first support means 33 and a second support means 34 which are mounted on the base 32 for supporting a ring 4 that is trained therearound. The first support means 33 has a slider 37 connected to a nut member 36 threaded over a ball screw 35 that extends in the direction in which the ring 4 extends between the first support means 33 and the second support means 34. The slider 37 supports thereon a first load measuring means 38 and a second load measuring means 39 disposed below the first load measuring means 38 in juxtaposed relationship thereto.

The base 32 also supports a motor 40 for rotating the ball screw 35 about its own axis. When the ball screw 35 is rotated about its own axis by the motor 40, the slider 37 moves toward or away from the second support means 34. The ball screw 35 and the motor 40 jointly make up a load imparting means for imparting a tensile load in a direction to expand the ring 4 trained around the first support means 33 and the second support means 34 by displacing the slider 37 to move the first support means 33 away from the second support means 34. The ball screw 35 and the motor 40 also serve as a correcting means as described in detail later on.

Figure 4:
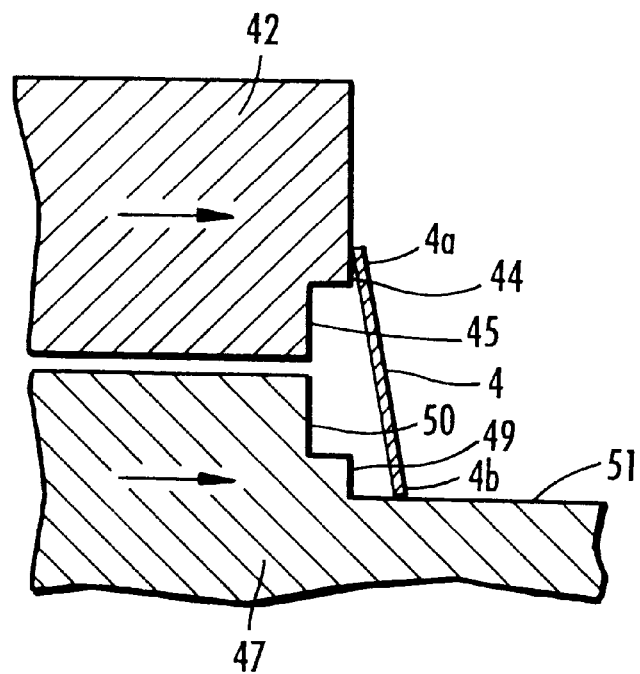
FIGS. 4(a) and 4(b) are fragmentary cross-sectional views showing the manner in which the apparatus shown in FIG. 3 operates.
Figure 4:
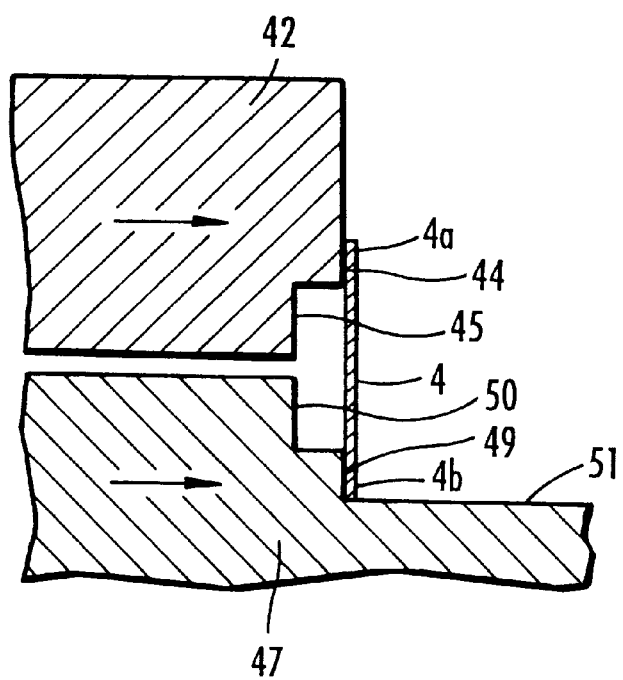

The first load measuring means 38 comprises a first abutment block, i.e., a first abutment member, 42 slidable on a rail 41 mounted on the slider 37, and a first load cell 43 for measuring a load that is applied from the ring 4 to the first abutment block 42. As shown in FIGS. 4(a) and 4(b) at an enlarged scale, the first abutment block 42 has an abutment edge 44 for abutment against the inner surface of an upper circumferential edge 4a of the ring 4 and a gap-defining surface 45 held out of contact with a portion of the ring 4 between the upper circumferential edge 4a of the ring 4 and a lower circumferential edge 4b of the ring 4.

As shown in FIG. 3, the second load measuring means 39 is disposed below and adjacent to the first load measuring means 38. The second load measuring means 39 comprises a second abutment block, i.e., a second abutment member, 47 slidable on a rail 46 mounted on the slider 37, and a second load cell 48 for measuring a load that is applied from the ring 4 to the second abutment block 47. As shown in FIGS. 4(a) and 4(b), the second abutment block 47 has an abutment edge 49 for abutment against the inner surface of the lower circumferential edge 4b of the ring 4, a gap-defining surface 50 held out of contact with a portion of the ring 4 between the upper circumferential edge 4a of the ring 4 and the lower circumferential edge 4b of the ring 4, and a bearing surface 51 extending outwardly from the lower end of the abutment edge 49 for bearing the ring 4 thereon.

As shown in FIG. 3, the second support means 34 comprises a support shaft 53 vertically mounted on a seat 52 of the base 32, a first abutment roller, i.e., another first abutment member, 54 rotatably supported on the support shaft 53, and a second abutment roller, i.e., another second abutment member, 55 disposed below and adjacent to the first abutment roller 54 and rotatably supported on the support shaft 53.

The first abutment roller 54 has an abutment edge 56 for abutment against the inner surface of the upper circumferential edge 4a of the ring 4 and a gap-defining surface 57 held out of contact with a portion of the ring 4 between the upper circumferential edge 4a of the ring 4 and the lower circumferential edge 4b of the ring 4. Similarly, the second abutment roller 55 has an abutment edge 58 for abutment against the inner surface of the lower circumferential edge 4b of the ring 4 and a gap-defining surface 59 held out of contact with a portion of the ring 4 between the upper circumferential edge 4a of the ring 4 and the lower circumferential edge 4b of the ring 4.

The motor 40 for rotating the ball screw 35 is controlled by a control means (not shown). The control means is electrically connected to the first load cell 43 and the second load cell 48, and controls the motor 40 depending on loads measured by the first and second load cells 43, 48. The control means has a circumferential length difference detecting means for detecting the circumferential length difference between the circumferential edges 4a, 4b of the ring 4 based on the difference between the load measured by the first load cell 43 and the load measured by the second load cell 48.

Figure 5:
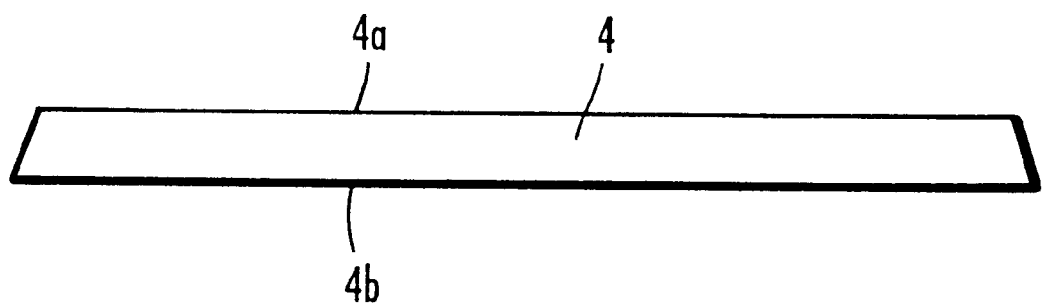
FIG. 5 is a side elevational view of a rolled ring.

A process of measuring the circumferential length difference between the circumferential edges 4a, 4b of the ring 4 with the circumferential length difference measuring apparatus 31 will be described below. The rolling apparatus 11 is effective to prevent the ring 4 from having a tapered cross-sectional shape. However, the ring 4 may possibly suffer a tapered cross-sectional shape because of a circumferential length difference, i.e., a circumferential dimensional difference, between the upper and lower circumferential edges 4a, 4b of the ring 4, as shown in FIG. 5. In FIG. 5, the tapered cross-sectional shape of the ring 4 is shown exaggerated.

The circumferential length difference measuring apparatus 31 measures a circumferential length difference between the upper and lower circumferential edges 4a, 4b of the ring 4 to detect whether the ring 4 has a tapered cross-sectional shape or not. If the measured ring 4 has a tapered cross-sectional shape, then the circumferential length difference measuring apparatus 31 feeds back the measured circumferential length difference to the rolling apparatus 11 to improve the accuracy with which the ring 4 is rolled, and performs a correcting process to eliminate the circumferential length difference between the upper and lower circumferential edges 4a, 4b of the ring 4.

As shown in FIG. 3, the ring 4 is trained around the abutment blocks 42, 47 of the first support means 33 and the abutment rollers 54, 55 of the second support means 34. Then, the motor 40 is energized to rotate the ball screw 35 about its own axis to move the slider 37 in a direction away from the second support means 34, thereby imparting a tensile load to the ring 4 to expand the ring 4. At this time, if the cross-sectional shape of the ring 4 is tapered, then the upper circumferential edge 4a whose circumferential length is smaller is brought into abutment against the first abutment block 42, and is expanded, as shown in FIG. 4(a). The ring 4 imparts a load on the first abutment block 42, and the imparted load is measured by the first load cell 43. As shown in FIG. 3, since the upper circumferential edge 4a is held in contact with, i.e., trained around, only the abutment edge 44 of the first abutment block 42 and the abutment edge 56 of the first abutment roller 54, the first load cell 43 can measure the load imposed on the upper circumferential edge 4a highly accurately.

As shown in FIG. 4(a), since the lower circumferential edge 4b of the ring 4 has a larger circumferential length than the upper circumferential edge 4a, the lower circumferential edge 4b is not held in abutment against the second abutment block 47. A load imposed by the lower circumferential edge 4b is measured by the second load cell 48 via the second abutment block 47.

Thereafter, when the slider 37 is displaced to increase the expansion of the upper circumferential edge 4a of the ring 4, as shown in FIG. 4(b), the lower circumferential edge 4b is brought into abutment against the second abutment block 47. As shown in FIG. 3, since the lower circumferential edge 4b is held in contact with, i.e., trained around, only the abutment edge 49 of the second abutment block 47 and the abutment edge 58 of the second abutment roller 55, the second load cell 48 can measure the load imposed on the lower circumferential edge 4b highly accurately.

At this time, the difference between the load measured by the first load cell 43 and the load measured by the second load cell 48 is maximum, and the circumferential length difference detecting means detects the circumferential length difference between the circumferential edges 4a, 4b of the ring 4 based on the difference between the load measured by the first load cell 43 and the load measured by the second load cell 48. The detected circumferential length difference between the circumferential edges 4a, 4b of the ring 4 based on the load difference is used to adjust the rolling apparatus 11 shown in FIG. 2, and is reflected in the formation of a ring 4 which is free of any circumferential length difference between the circumferential edges 4a, 4b thereof.

Inasmuch as the difference between the loads imposed on the circumferential edges 4a, 4b still remains present at this time, when the slider 37 is displaced toward the second support means 34, the upper circumferential edge 4a under the higher load resiliently springs back, reducing its circumferential length. Therefore, the tapered cross-sectional shape of the ring 4 is not improved.

Now, the motor 40 is energized to rotate the ball screw 35 about its own axis to move the slider 37 away from the second support means 34 for thereby applying a tensile load to the ring 4. Therefore, the ball screw 35 and the motor 40 function as the correcting means. As shown in FIG. 4(b), the ring 4 is expanded with the upper and lower circumferential edges 4a, 4b held in abutment against the respective abutment blocks 42, 47. At this time, the loads imposed on the upper and lower circumferential edges 4a, 4b are also detected by the first load cell 43 and the second load cell 48, respectively.

As the slider 37 is further displaced progressively away from the second support means 34, the difference between the loads imposed on the upper and lower circumferential edges 4a, 4b is reduced. The slider 37 is further displaced progressively away from the second support means 34 until the loads imposed on the upper and lower circumferential edges 4a, 4b are equalized to each other. After any difference between the loads imposed on the upper and lower circumferential edges 4a, 4b is eliminated, the slider 37 is moved back toward the second support means 34. The ring 4 is now corrected out of the tapered cross-sectional shape, and has the same circumferential length along both the upper and lower circumferential edges 4a, 4b thereof.

When the ring 4 is trained around the abutment blocks 42, 47 of the first support means 33 and the abutment rollers 54, 55 of the second support means 34, and the slider 37 is displaced away from the second support means 34, if there is no difference between the load measured by the first load cell 43 and the load measured by the second load cell 48, the ring 4 is judged as acceptable because it has the same circumferential length along both the upper and lower circumferential edges 4a, 4b thereof.

In the circumferential length difference measuring apparatus 31 shown in FIG. 3, the first support means 33 is displaced away from the second support means 34 by the slider 37 to apply a tensile load to the ring 4. However, the second support means 34 may be made movable, and may be displaced away from the first support means 33 to apply a tensile load to the ring 4.

In the circumferential length difference measuring apparatus 31 shown in FIG. 3, moreover, the slider 37 is moved by the ball screw 35 and the motor 40 which serve as both the load imparting means and the correcting means. However, the slider 37 may be moved by a cylinder or the like, not shown.

The ring 4 that has been judged as acceptable or corrected out of the tapered cross-sectional shape by the circumferential length difference measuring apparatus 31 is subjected to a solution treatment, and then corrected for its circumferential length. The circumferential length of the ring 4 is corrected by a circumferential length correcting apparatus 61 shown in FIG. 6.

Figure 6:
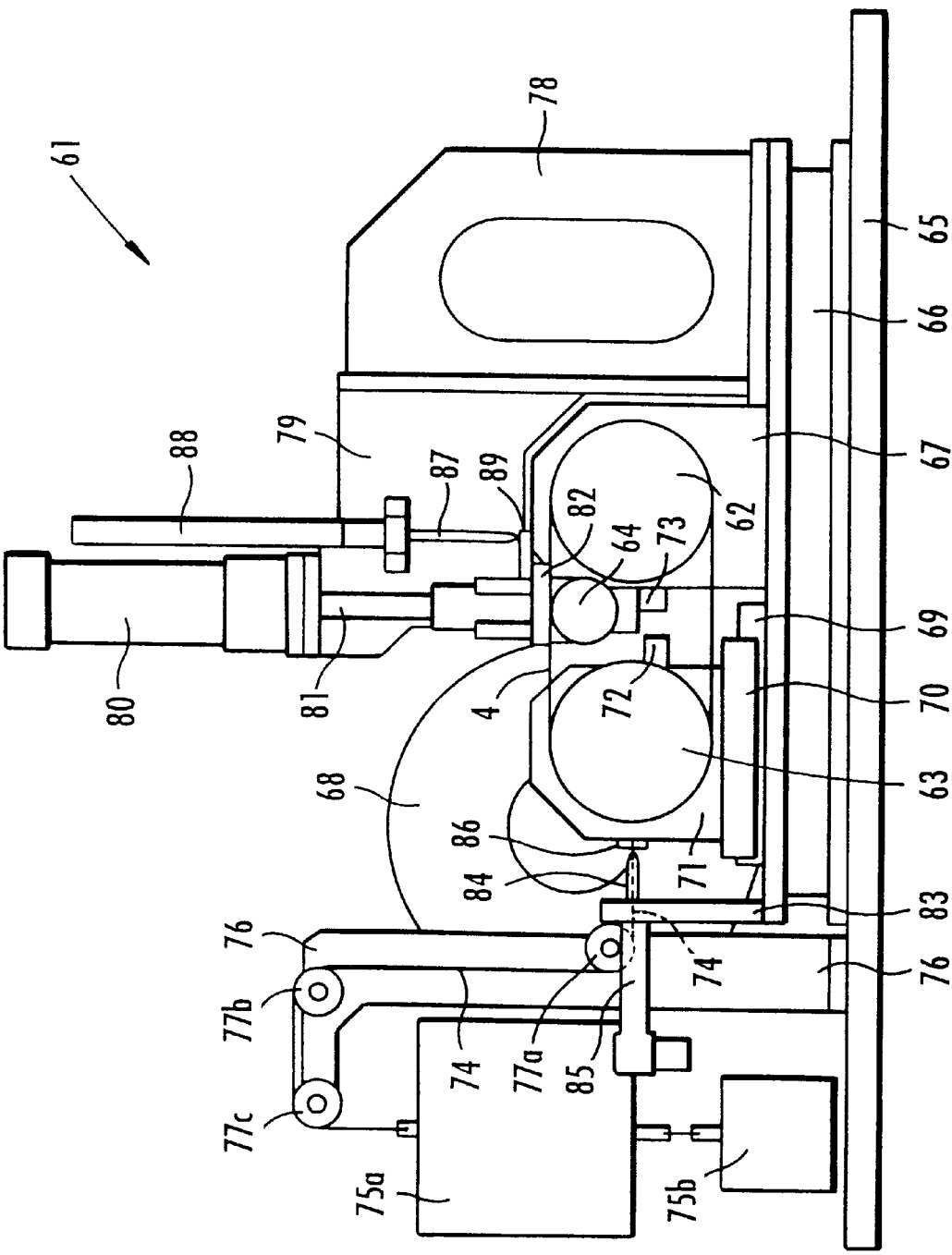
FIG. 6 is a side elevational view of an apparatus for correcting the circumferential length of a ring in the method according to the present invention.

As shown in FIG. 6, the circumferential length correcting apparatus 61 has a drive roller 62 and a driven roller 63 around which the ring 4 is trained, and a correction roller 64 disposed intermediate between the drive roller 62 and the driven roller 63. The drive roller 62 is rotatably supported on a table 66 mounted on a base 65 by a support 67, and operatively coupled to a motor 68 as a rotary actuator disposed behind the table 66 by a coupling mechanism, not shown.

The driven roller 63 is rotatably supported by a support 71 on a guide block 70 that is horizontally slidably mounted on a guide rail 69 fixedly mounted on the table 66. The guide block 70 has an actuator, not shown, for moving the driven roller 63 toward and away from the drive roller 62. The ring 4 is trained around the drive roller 62 and the driven roller 63 when a projection 72 on the support 71 is held against a projection 73 on the support 67. Counterweights 75a, 75b are coupled to the support 71 by a wire 74. After the ring 4 is trained around the drive roller 62 and the driven roller 63, the driven roller 63 is released from the actuator, and displaced away from the drive roller 62 under the load imposed by the counterweights 75a, 75b. The wire 74 is trained around rolls 77a, 77b, 77c rotatably supported on a substantially L-shaped support column 76 vertically mounted on the base 65 near an end of the guide rail 69. The load imposed by the counterweights 75a, 75b that are joined to an end of the wire 74 is converted from a vertical direction into a horizontal direction by the rolls 77a, 77b, 77c, and applied to the support 71.

A frame 78 is vertically mounted on an end of the table 66 near the drive roller 62. A support plate 79 is fixed to an upper portion of the frame 78 and supports thereon a hydraulic cylinder 80 whose piston rod 81 is displaceable in a vertical direction perpendicularly to the direction in which the driven roller 63 is displaceable. The correction roller 64 is rotatably supported on a lower end of the piston rod 81 by a support 82.

A support column 83 is vertically mounted on an end of the table 66 near the guide rail 69. The support column 83 supports thereon a first displacement sensor 85 having a probe 84 that is displaceable in a horizontal direction parallel to the direction in which the driven roller 63 is displaceable. The probe 84 is normally biased toward the driven roller 63 by a spring, not shown, to have its tip end held against an abutment member 86 on the support 71 for displacement in unison with the support 71. As a result, the first displacement sensor 85 detects the displacement of the driven roller 63 from a reference position of the support 71 in which the ring 4 is trained around the drive roller 62 and the driven roller 63.

The support plate 79 supports thereon a second displacement sensor 88 having a probe 87 that is displaceable in a vertical direction parallel to the axis of the hydraulic cylinder 80. The probe 87 is normally biased toward the drive roller 62 by a spring, not shown, to have its tip end held against an abutment member 89 projecting horizontally from the support 82 for displacement in unison with the support 82. As a result, the second displacement sensor 88 detects the displacement of the correction roller 64 from a reference position of the support 82 in which the ring 4 is trained around the drive roller 62 and the driven roller 63.

The circumferential length correcting apparatus 61 shown in FIG. 6 corrects the circumferential length of the ring 4 as follows: The guide block 70 is moved by the actuator toward the drive roller 62 until the projection 72 on the support 71 is held against the projection 73 on the support 67. Then, the ring 4 is trained around the drive roller 62, the driven roller 63, and the correction roller 64.

After the ring 4 is trained in position, the guide block 70 is released from the actuator, and a load of 30 kgf, for example, is applied from the counterweights 75a, 75b to the support 71. As a consequence, the driven roller 63 is displaced away from the drive roller 62, keeping the ring 4 taut under the load applied by the counterweights 75a, 75b. The control means energizes the motor 68 to rotate the drive roller 62 at a speed of 150 rpm or higher, rotating the ring 4 to uniformize the metal structure thereof.

While the drive roller 62 is being rotated to rotate the ring 4 that is kept taut, the control means detects the displacement of the driven roller 63 with the first displacement sensor 85, and calculates the actual circumferential length of the ring 4 from the axis-to-axis distance between the drive roller 62 and the driven roller 63. Then, the control means calculates a distance that the correction roller 64 needs to be displaced in order to correct the ring 4 at a desired circumferential length, from the difference between the calculated actual circumferential length of the ring 4 and the desired circumferential length.

Then, the control means actuates the hydraulic cylinder 80 to bias the correction roller 64 upwardly. Under the biasing force applied from the hydraulic cylinder 80, the driven roller 63 is displaced toward the drive roller 62 until the projections 72, 73 on the supports 71, 67 abut against each other, whereupon the drive roller 62 and the driven roller 63 are kept at a given distance from each other. The correction roller 64 is displaced upwardly to extend the ring 4 thereby to cause plastic deformation to the ring 4.

Figure 7:
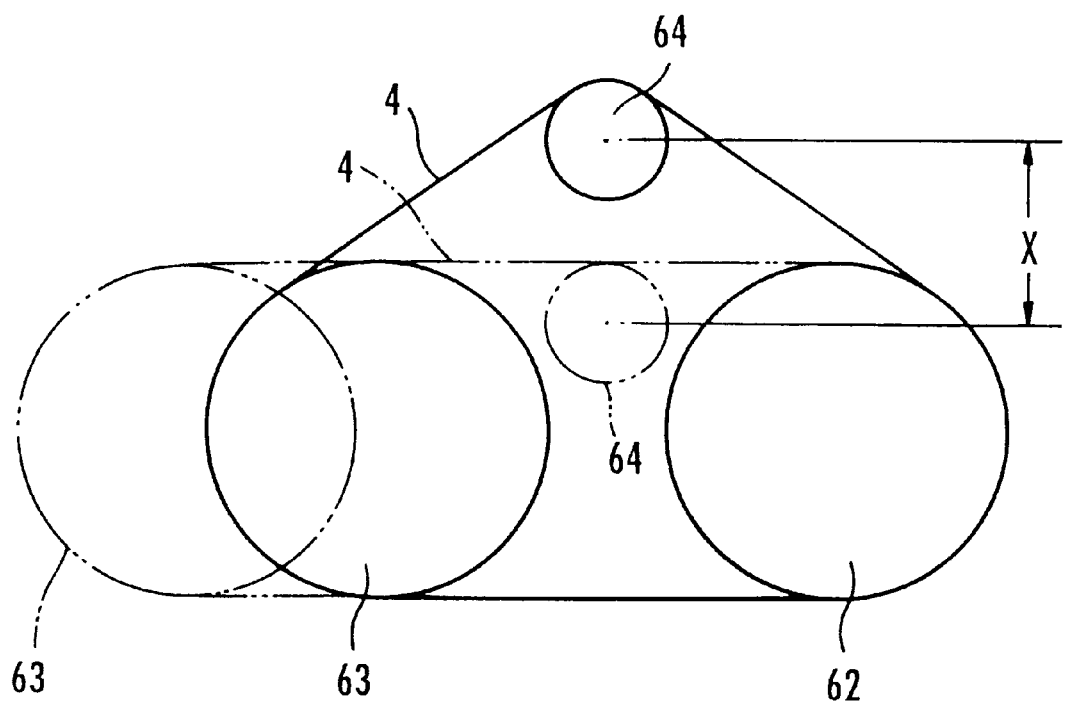
FIG. 7 is a diagram illustrative of a process of correcting the circumferential length of a ring, which is performed by the apparatus shown in FIG. 6.

As schematically shown in FIG. 7, the correction roller 64 is progressively displaced upwardly from a position represented by the imaginary position, by a distance depending on the plastic deformation of the ring 4. The control means detects the displacement X of the correction roller 64 with the second displacement sensor 88. When the displacement X reaches a calculated numerical value representing a displacement required to correct the ring 4 at the desired circumferential length, the control means stops displacing the correction roller 64 upwardly. The driven roller 63 is then displaced again under the load from the counterweights 75a, 75b, keeping the ring 4 taut. The control means calculates the actual circumferential length of the ring 4 which has been corrected from the axis-to-axis distance between the drive roller 62 and the driven roller 63. Then, the control means calculates the difference between the actual circumferential length of the ring 4 which has been corrected and the desired circumferential length. If the actual circumferential length of the ring 4 which has been corrected is equal to the desired circumferential length, then the control means finishes the correcting process. If the actual circumferential length of the ring 4 which has been corrected is not equal to the desired circumferential length, then the control means repeats the above correcting process based on the calculated difference between the actual circumferential length of the ring 4 which has been corrected and the desired circumferential length. As a result, the actual circumferential length of the ring 4 is corrected reliably at the desired circumferential length.

The above correcting process, however, is problematic in that the correction roller 64 may be required to be displaced upwardly by the hydraulic cylinder 80 in a plurality of repeated cycles until the actual circumferential length of the ring 4 is corrected at the desired circumferential length.

Figure 8:
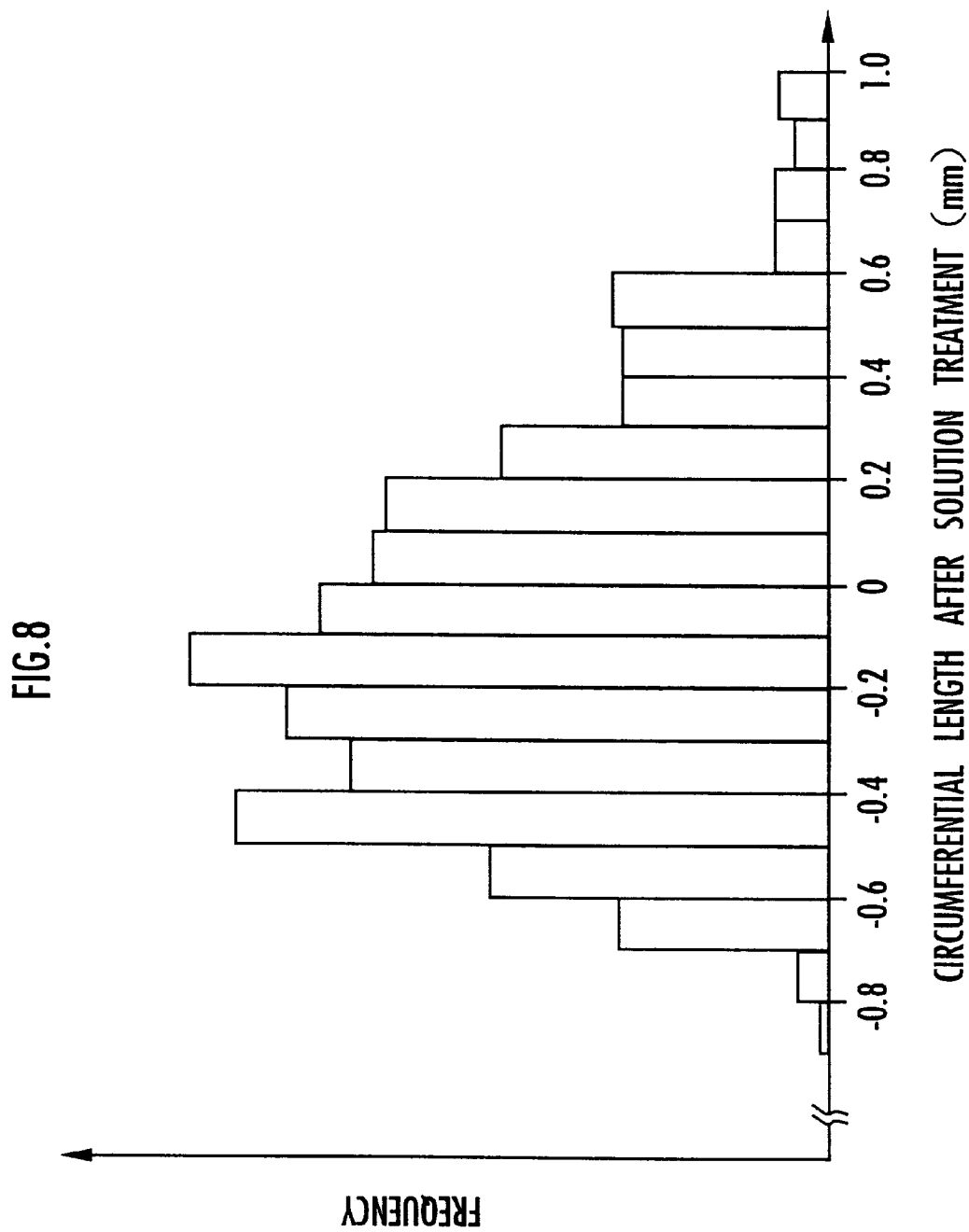
FIG. 8 is a histogram showing a distribution of the actual circumferential lengths of rings which are to be corrected by the apparatus shown in FIG. 6.

According to one solution, the target circumferential length for the ring 4 in the rolling process may be used as a reference value, and the correction roller 64 may be displaced upwardly by a predetermined distance X with respect to the reference value, so that the correction roller 64 may be displaced upwardly only once to correct the circumferential length of the ring 4 at the desired circumferential length. However, rolled rings 4 have a considerably large distribution of actual circumferential lengths; e.g., as shown in FIG. 8, the difference between the largest and smallest actual circumferential lengths is 1.8 mm with the reference value at 0 mm. The reasons why the distribution of actual circumferential lengths is so large are that the compositions of lots of maraging steel as the material of the metal ring vary from each other, the reduction ratios of rolling processes vary from each other, and the release rates for residual stresses vary from each other.

If the distance X that the correction roller 64 is to be displaced is determined evenly with respect to the reference value for rings 4 whose actual circumferential lengths are distributed in the range as shown in FIG. 8, then the corrected circumferential lengths of the rings are also distributed in a wide range dependent on the distribution shown in FIG. 8.

According to the present embodiment, the circumferential length correcting apparatus 61 shown in FIG. 6 performs a circumferential length correcting process as follows: After the ring 4 is trained around the drive roller 62, the driven roller 63, and the correction roller 64, the driven roller 63 is displaced away from the drive roller 62. When the ring 4 is rotated and taut under the load from the counterweights 75a, 75b, the control means determines the actual circumferential length of the ring 4 based on the axis-to-axis distance between the drive roller 62 and the driven roller 63 which is calculated from the displacement of the support 71 that is detected by the first displacement sensor 85 via the probe 84 thereof.

Then, the control means determines the difference between the actual circumferential length of the ring 4 and the reference value, described above, and corrects the distance X that the correction roller 64 is to be displaced. Specifically, the distance X is corrected by adding a predetermined corrective value to the distance X if the actual circumferential length of the ring 4 is smaller than the reference value, and subtracting the predetermined corrective value from the distance X if the actual circumferential length of the ring 4 is greater than the reference value.

Figure 9:
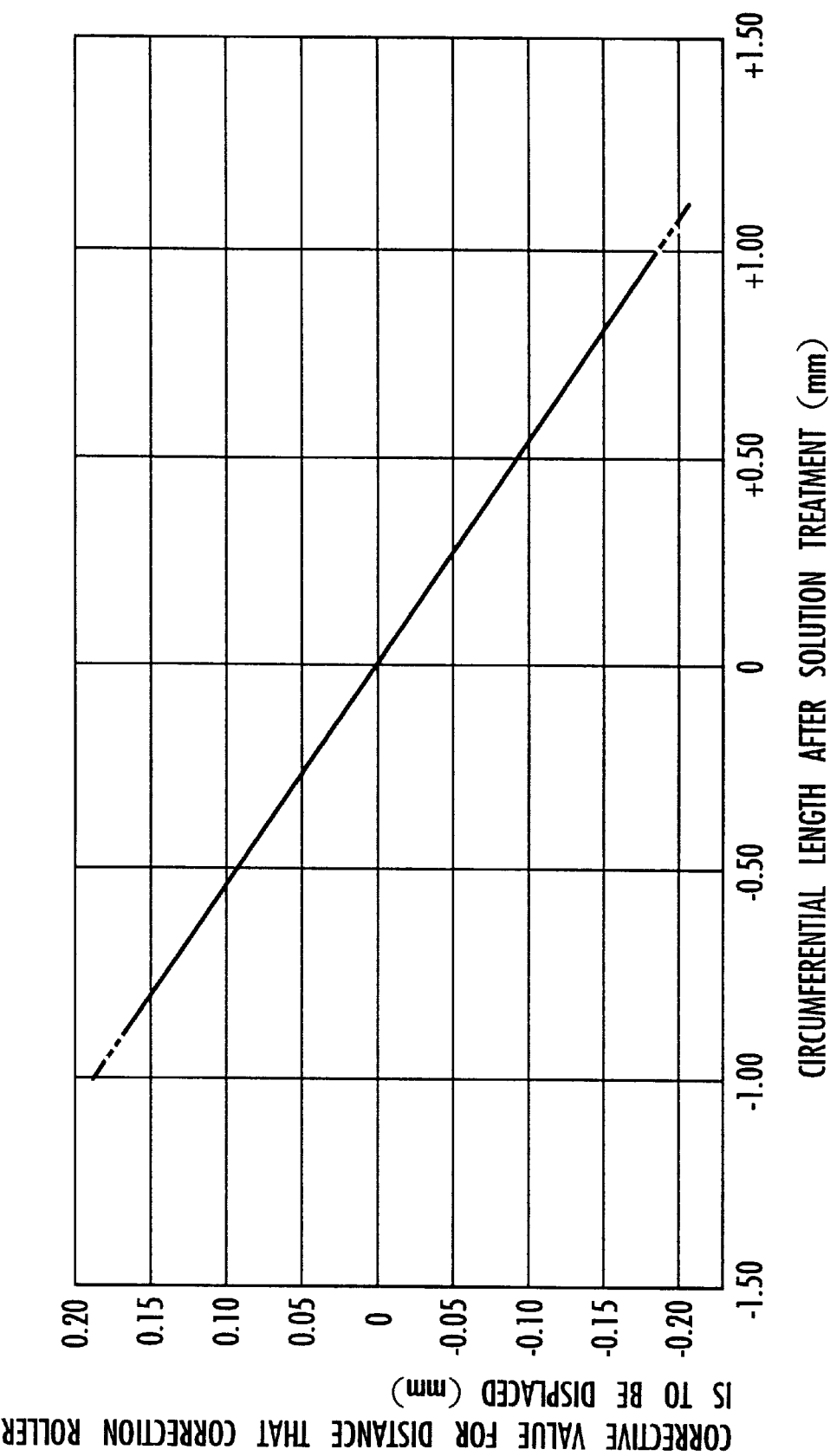
FIG. 9 is a graph showing the relationship between the actual circumferential length of a ring and the corrective value for the distance that a correction roller is to be displaced.

The corrective value ΔX to be added to or subtracted from the distance X is expressed by the following equation (1):

$$\Delta X = -a\,(L - \text{reference value}) \quad (1)$$

where L represents the actual circumferential length of the ring 4 and "a" represents a constant in a range from 0.10 to 0.20 which is determined by which layer the ring 4 occupies in the resultant laminated ring. FIG. 9 shows the relationship between the actual circumferential length L of the ring 4 and the corrective value ΔX for the distance X that the correction roller 64 is to be displaced, with a 0.18.

Based on the calculated distance X+ΔX, the control means causes the hydraulic cylinder 80 to displace the correction roller 64 upwardly to cause plastic deformation to the ring 4 until the displacement of the correction roller 64 as detected by the second displacement sensor 88 reaches the calculated distance X+ΔX, while the drive roller 62 and the driven roller 63 are being kept at the given distance from each other, as described above. When the displacement of the correction roller 64 reaches the calculated distance X+ΔX, the control means holds the correction roller 64 displaced by the calculated distance X+ΔX for a predetermined time, e.g., 4±0.2 seconds. By holding the correction roller 64 displaced by the calculated distance X+ΔX for the predetermined time, the ring 4 is reliably deformed to the circumferential length corresponding to the displacement, so that the ring 4 will attain the stable circumferential length that has been corrected.

Then, the control means deactivates the hydraulic cylinder 80 to stop displacing the correction roller 64. When the correction roller 64 returns to its original lower position, the control means stops the drive roller 62. The corrected ring 4 is then removed.

In the above embodiment, the corrective value ΔX is continuously determined with respect to the actual circumferential length L of the ring 4. However, the corrective value ΔX may be determined each time the actual circumferential length L changes by 50 μm.

In the above embodiment, the driven roller 63 is displaced away from the drive roller 62 when the actual circumferential length L of the ring 4 is to be determined. However, when the actual circumferential length L of the ring 4 is to be determined, the drive roller 62 may be displaced away from the driven roller 63 or both the drive roller 62 and the driven roller 63 may be displaced away from each other.

After the circumferential length of the ring 4 has been corrected by the circumferential length correcting apparatus 61 shown in FIG. 6, the corrected circumferential length of the ring 4 is accurately measured, and the ring 4 is classified into one of ranges of circumferential lengths. The circumferential length of the ring 4 is measured by a circumferential length measuring apparatus 91 shown in FIG. 10.

Figure 10:
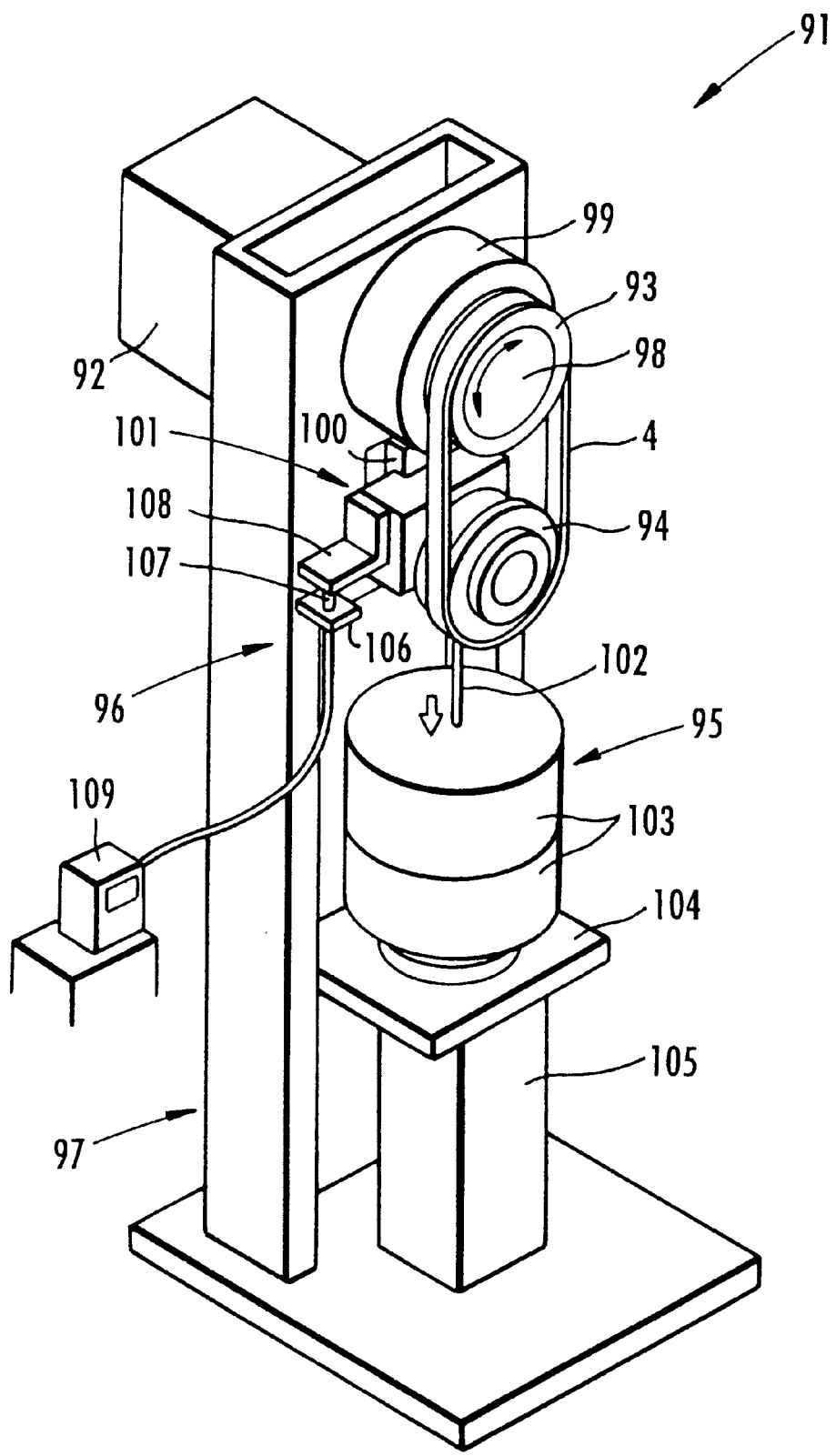
FIG. 10 is a perspective view of an apparatus for measuring the circumferential length of a ring which has been corrected.

As shown in FIG. 10, the circumferential length measuring apparatus 91 comprises a drive roller 93 coupled to a motor 92, a driven roller 94 vertically movable toward and away from the drive roller 93, a tension applying means 95 for applying a tension to the ring 4 via the driven roller 94 while the ring 4 is being trained around the drive roller 93 and the driven roller 94, and a measuring means 96 for detecting the displacement of the driven roller 94 to measure the circumferential length of the ring 4 while the ring 4 is being moved in a circulative fashion around the drive roller 93 and the driven roller 94 by rotating the drive roller 93.

The circumferential length measuring apparatus 91 has a vertical frame 97 with the motor 92 fixed to the back side of an upper portion of the frame 97. The motor 92 has a rotatable shaft connected to a rotatable shaft 98 of the drive roller 93 via a coupling, not shown. The rotatable shaft 98 is rotatably supported in a housing 99 fixed to the face side of the frame 97 by a bearing, not shown. The drive roller 93 is fixedly mounted on an end of the rotatable shaft 98.

A rail 100 is mounted on the frame 97 below the housing 99, and a bracket 101 is vertically movably mounted on the rail 100. The bracket 101 is supported at a lower end of the rail 100, and the driven roller 98 is rotatably mounted on the bracket 101.

The tension applying means 95 comprises a plurality of counterweights 103 suspended from the bracket 101 by a wire 102, and a vertically movable counterweight holder 104 which holds the counterweights 103 thereon. the frame 97 supports on its lower end an electrically operable cylinder 105 having a rod, not shown, projecting upwardly and supporting the counterweight holder 104 on its distal end.

The measuring means 96 has a measuring finger 107 fixed to the frame 97 by an attachment 106. The measuring finger 107 has a tip end held against an L-shaped engaging member 108 fixed to a side surface of the bracket 101. The measuring finger 107 is connected to a display unit 109 for displaying a measured result thereon.

The circumferential length measuring apparatus 91 operates as follows: When the electrically operable cylinder 105 is actuated to displace the counterweight holder 104 upwardly, the counterweights 103 are displaced upwardly. Therefore, the counterweights 103 do not impose tensile forces on the bracket 101. Then, the ring 4 is trained around the drive roller 93 and the driven roller 94.

Then, the electrically operable cylinder 105 is actuated to displace the counterweight holder 104 and the counterweights 103 together downwardly. The counterweights 103 are suspended from the bracket 101 by the wire 102, and only the counterweight holder 104 is further lowered.

Therefore, the ring 4 is tensioned by the counterweights 103 through the driven roller 94. The motor 92 is energized to rotate the rotatable shaft 98 about its own axis.

Since the drive roller 93 is fixed to the rotatable shaft 98, the ring 4 is moved in a circulative fashion around the drive roller 93 and the driven roller 94 by the rotation of the drive roller 93. The measuring finger 107 held against the engaging member 108 that is fixed to the bracket 101 supporting the driven roller 94 detects the displacement of the driven roller 94. The distance between the drive roller 93 and the driven roller 94 is determined from the displacement of the driven roller 94 which is detected by the measuring finger 107, and the accurate circumferential length of the ring 4 is calculated based on the determined distance. The display unit 109 displays the calculated circumferential length of the ring When the circumferential length of the ring 4 is measured by the circumferential length correcting apparatus 91, the measured circumferential length varies periodically as the ring 4 is moved in a circulative fashion around the drive roller 93 and the driven roller 94. For this reason, the circumferential length measuring apparatus 91 continuously measures the displacement of the driven roller 94 with the measuring means 96 while the ring 4 is being moved in a circulative fashion around the drive roller 93 and the driven roller 94, and determines an average value of circumferential lengths of the ring 4 while the ring 4 is in constant-speed rotation as the circumferential length of the ring 4. In this manner, the circumferential length of the ring 4 can be measured more reliably.

Based on the accurately measured circumferential length of the ring 4, the ring 4 is classified into one of ranges of circumferential lengths. From the classified rings 4, those rings 4 that can be fitted and laminated together are selected. Then, a plurality of rings 4 whose circumferential lengths are slightly different from each other are fitted and laminated together into a laminated ring 6, as shown in FIG. 1.

Although a certain preferred embodiment of the present invention have been shown and described in detail, it should be understood that various changes and modifications may be made therein without departing from the scope of the appending claims.

What is claimed is:

1. A method of manufacturing a laminated ring by severing a cylindrical drum, which comprises a sheet of maraging steel with welded opposite ends, into a plurality of rings of predetermined width, rolling said rings to a predetermined target circumferential length, correcting circumferential lengths of the rings, aging and nitriding the rings, and laminating the rings into a laminated ring for transmitting power in a continuously variable transmission, said method comprising the steps of:

measuring a load applied to a circumferential edge of each of the rolled rings and a load applied to another circumferential edge thereof while supporting an inner circumferential surface of the ring and applying a tensile load in a direction to expand the ring; and detecting the difference between circumferential lengths of the circumferential edges of the ring based on the difference between the loads applied to the circumferential edges when said difference between the loads is maximum.

2. A method according to claim 1, further comprising the steps of:

after the step of detecting the difference between circumferential lengths of the circumferential edges of the ring, correcting the ring in shape to equalize the circumferential lengths of the circumferential edges of the ring by applying a tensile load to the ring until the loads applied to the circumferential edges of the ring are equalized.

3. A method according to claim 2, further comprising the steps of:

training said ring which has been corrected in shape to equalize the circumferential lengths of the circumferential edges thereof, around a drive roller and a driven roller which are displaceable in directions toward and away from each other and a correction roller disposed intermediate between said drive roller and said driven roller and displaceable in directions perpendicular to the directions in which said drive roller and said driven roller are displaceable;

displacing said drive roller and said driven roller away from each other under a given force, determining an actual circumferential length of the ring while keeping the ring taut around said drive roller and said driven roller, determining the difference between the actual circumferential length of the ring and the target circumferential length for the rolled ring as a reference value, and calculating a distance that said correction roller is to be displaced depending on the difference between the actual circumferential length and the reference value; and holding said drive roller and said driven roller spaced by a predetermined distance from each other, and displacing said correction roller in a direction perpendicular to the directions in which said drive roller and said driven roller are displaceable and to extend said ring, by the calculated distance depending on the difference between the actual circumferential length and the reference value, for thereby correcting the circumferential length of the ring.

4. A method according to claim 3, wherein said step of calculating the distance that said correction roller is to be displaced comprises the step of adding a corrective value established depending on the difference between the actual circumferential length and the reference value, to said reference value or subtracting the corrective value from the reference value.

5. A method according to claim 3, further comprising the step of:

holding said correction roller displaced by the calculated distance until said ring keeps the shape extended by said correction roller when said ring is released from said correction roller, for thereby correcting the circumferential length of the ring.

6. A method of manufacturing a laminated ring by severing a cylindrical drum, which comprises a sheet of maraging steel with welded opposite ends, into a plurality of rings of predetermined width, rolling said rings to a predetermined target circumferential length, correcting circumferential lengths of the rings, aging and nitriding the rings, and laminating the rings into a laminated ring for transmitting power in a continuously variable transmission, said method comprising the steps of:

training each of the rings which is shaped to have the same circumferential length along the circumferential edges thereof, around a drive roller and a driven roller which are displaceable in directions toward and away from each other and a correction roller disposed intermediate between said drive roller and said driven roller and displaceable in directions perpendicular to the directions in which said drive roller and said driven roller are displaceable;

displacing said drive roller and said driven roller away from each other under a given force, determining an actual circumferential length of the ring while keeping the ring taut around said drive roller and said driven roller, determining the difference between the actual circumferential length of the ring and the target circumferential length for the rolled ring as a reference value, and calculating a distance that said correction roller is to be displaced depending on the difference between the actual circumferential length and the reference value; and holding said drive roller and said driven roller spaced by a predetermined distance from each other, and displacing said correction roller in a direction perpendicular to the directions in which said drive roller and said driven roller are displaceable and to extend said ring, by the calculated distance depending on the difference between the actual circumferential length and the reference value, for thereby correcting the circumferential length of the ring.

7. A method according to claim 6, wherein said step of calculating the distance that said correction roller is to be displaced comprises the step of adding a corrective value established depending on the difference between the actual circumferential length and the reference value, to said reference value or subtracting the corrective value from the reference value.

8. A method according to claim 6, further comprising the step of:

holding said correction roller displaced by the calculated distance until said ring keeps the shape extended by said correction roller when said ring is released from said correction roller, for thereby correcting the circumferential length of the ring.

9. An apparatus for measuring the difference between the circumferential lengths of circumferential edges of each of rings produced by severing a cylindrical drum, which comprises a sheet of maraging steel with welded opposite ends, into a plurality of rings of predetermined width, and rolling said rings to a predetermined target circumferential length, comprising:

a pair of support means for supporting the ring trained therearound;

load imparting means for imparting a tensile load to said ring by spacing said support means away from each other;

first load measuring means mounted on one of said support means, for abutting against an inner surface of one of the circumferential edges of the ring and measuring a load imparted to said one of the circumferential edges of the ring;

second load measuring means disposed in juxtaposed relationship to said first load measuring means, for abutting against an inner surface of the other circumferential edge of the ring and measuring a load imparted to said other circumferential edge of the ring; and circumferential length difference detecting means for detecting the difference between the circumferential lengths of the circumferential edges of the ring based on the difference between the load measured by said first load measuring means and the load measured by said second load measuring means when said difference between the loads is maximum.

10. An apparatus according to claim 9, wherein said first load measuring means has a first abutment member for abutment against the inner surface of said one circumferential edge of the ring, and said second load measuring means has a second abutment member for abutment against the inner surface of said other circumferential edge of the ring;

said first abutment member and said second abutment member being disposed in juxtaposed relationship to each other with a gap interposed therebetween which is held out of contact with an inner surface of the ring between the circumferential edges thereof;

the other of the support means having another first abutment member for abutment against the inner surface of said one circumferential edge of the ring which is opposite to the inner surface of said one circumferential edge of the ring against which said first abutment member abuts, and another second abutment member for abutment against the inner surface of said other circumferential edge of the ring which is opposite to the inner surface of said other circumferential edge of the ring against which said second abutment member abuts;

said other first abutment member and said other second abutment member being disposed on said other support means in juxtaposed relationship to each other with a gap interposed therebetween which is held out of contact with an inner surface of the ring between the circumferential edges thereof.

11. An apparatus according to claim 9, further comprising correction means for applying a tensile load to the ring until the load measured by said first load measuring means and the load measured by said second load measuring means are equalized to each other, for thereby correcting the ring in shape to equalize the circumferential lengths of the circumferential edges of the ring.

* * * * *